United States Patent
Iijima et al.

(10) Patent No.: US 11,961,342 B2
(45) Date of Patent: Apr. 16, 2024

(54) DRIVING ASSISTANCE METHOD AND DRIVING ASSISTANCE DEVICE

(71) Applicant: NISSAN MOTOR CO., LTD., Yokohama (JP)

(72) Inventors: Kazuki Iijima, Kanagawa (JP); Yuki Fujita, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 387 days.

(21) Appl. No.: 16/771,859

(22) PCT Filed: Dec. 15, 2017

(86) PCT No.: PCT/JP2017/045172
§ 371 (c)(1),
(2) Date: Jun. 11, 2020

(87) PCT Pub. No.: WO2019/116557
PCT Pub. Date: Jun. 20, 2019

(65) Prior Publication Data
US 2021/0174615 A1    Jun. 10, 2021

(51) Int. Cl.
*G07C 5/08* (2006.01)
*B60W 50/14* (2020.01)
(Continued)

(52) U.S. Cl.
CPC .......... *G07C 5/0816* (2013.01); *B60W 50/14* (2013.01); *G06V 20/56* (2022.01); *G07C 5/0841* (2013.01);
(Continued)

(58) Field of Classification Search
CPC ......... B60K 2370/161; B60R 16/0234; B60W 50/14; B60W 2050/143; B60W 50/029;
(Continued)

(56) References Cited

U.S. PATENT DOCUMENTS

| 4,184,146 A * | 1/1980 | Fratzke ................ G07C 5/0816 340/459 |
| 8,999,583 B2 | 4/2015 | Hirose et al. |

(Continued)

FOREIGN PATENT DOCUMENTS

| DE | 10 2015 223 612 A1 | 6/2017 |
| JP | 2013-180645 A | 9/2013 |

(Continued)

*Primary Examiner* — Geepy Pe
*Assistant Examiner* — Paulo Roberto Gonzalez Leite
(74) *Attorney, Agent, or Firm* — Foley & Lardner LLP (57) ABSTRACT

A driving assistance device includes a malfunction detection unit configured to detect a plurality of malfunctions in devices mounted on a vehicle, a candidate selection unit configured to select candidates for a plurality of actions urged on a driver in accordance with the plural malfunctions detected by the malfunction detection unit, a priority determination unit configured to choose a candidate having a higher priority as an action urged on the driver from the candidates for the plural actions selected by the candidate selection unit, and an information unit configured to inform the driver of the action to be urged on the driver chosen by the priority determination unit.

9 Claims, 7 Drawing Sheets

(51) Int. Cl.
*G06V 20/56* (2022.01)
*G08G 1/14* (2006.01)

(52) U.S. Cl.
CPC ............ *G08G 1/141* (2013.01); *G08G 1/145* (2013.01); *B60W 2050/143* (2013.01)

(58) Field of Classification Search
CPC .......... B60W 50/035; B60W 2050/146; G07C 5/0816; G07C 5/0841; G08G 1/141; G08G 1/145; G08G 1/16; G06V 20/56
See application file for complete search history.

(56) References Cited

U.S. PATENT DOCUMENTS

| | | | |
|---|---|---|---|
| 10,083,588 B1* | 9/2018 | Kapoor | B60Q 3/10 |
| 2002/0123833 A1* | 9/2002 | Sakurai | H04W 24/00 |
| | | | 701/31.4 |
| 2013/0060412 A1 | 3/2013 | Nakagawara et al. | |
| 2014/0277995 A1 | 9/2014 | Slaton et al. | |
| 2017/0162051 A1* | 6/2017 | Satoh | G08G 1/0965 |

FOREIGN PATENT DOCUMENTS

| | | |
|---|---|---|
| JP | 2015-38894 A | 2/2015 |
| JP | 2017-030662 A | 2/2017 |
| WO | WO 2011/145423 A1 | 11/2011 |

\* cited by examiner

DRIVING ASSISTANCE METHOD AND DRIVING ASSISTANCE DEVICE

TECHNICAL FIELD

The present invention relates to a driving assistance method and a driving assistance device.

BACKGROUND ART

A technique is known that calls a driver's attention to information on malfunctions when caused in a vehicle (Patent Literature 1). The technique disclosed in Patent Literature 1 notifies the driver of the information on malfunctions with regard to a rotation rate of an engine, a remaining amount of fuel, or a temperature of a coolant in the engine.

CITATION LIST

Patent Literature

Patent Literature 1: Japanese Unexamined Patent Application Publication No. 2015-38894

SUMMARY OF INVENTION

Technical Problem

It is preferable to notify the driver of the information having a higher priority when several malfunctions are caused simultaneously in the vehicle. Patent Literature 1 does not mention the priority of the information, which needs to be dealt with.

To solve the conventional problem described above, the present invention provides a driving assistance method and a driving assistance device capable of notifying a driver of information having a higher priority when several malfunctions are caused in a vehicle.

Technical Solution

A driving assistance method according to a first aspect of the present invention detects a plurality of malfunctions in devices mounted on a vehicle, and selects candidates for a plurality of actions urged on a driver in accordance with the detected plural malfunctions. The driving assistance method chooses a candidate having a higher priority as an action to be urged on the driver from the candidates for the plural actions, and informs the driver of the chosen action so as to be urged on the driver.

Advantageous Effects

The present invention can notify the driver of the information having a higher priority when several malfunctions are caused in the vehicle.

DESCRIPTION OF EMBODIMENTS

Hereinafter, embodiments according to the present invention will be described with reference to the drawings. The same elements illustrated with reference to the drawings are indicated by the same reference numerals, and overlapping explanations are not made below.

First Embodiment

Figure 1:
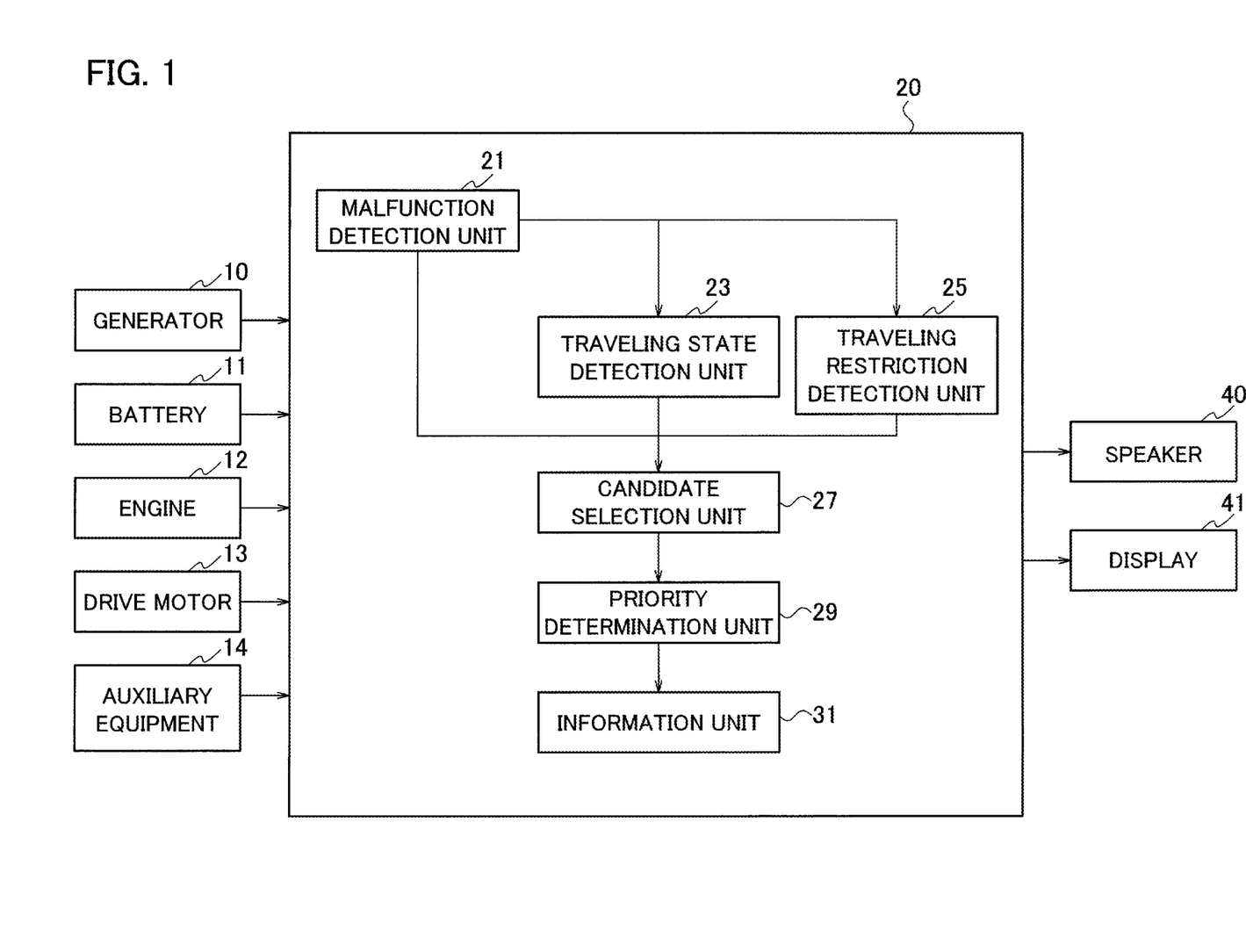
FIG. 1 is a schematic configuration diagram of a driving assistance device according to a first embodiment of the present invention.

An example of a configuration of a driving assistance device according to a first embodiment is described below with reference to FIG. 1. The driving assistance device informs a driver of an action to be urged, depending on a plurality of malfunctions caused in devices mounted on a vehicle. Examples of devices mounted on the vehicle include a generator 10, a battery 11, an engine 12, a drive motor 13, and auxiliary equipment 14, as shown in FIG. 1. The devices mounted on the vehicle are not limited to these elements, and may further include a radiator and a transmission.

As shown in FIG. 1, the driving assistance device includes a controller 20, a speaker 40, and a display 41. As used in the first embodiment, the vehicle refers to an automobile that the driver rides on unless otherwise specified.

The generator 10 receives power from the engine 12 to charge the battery 11. The battery 11 supplies electricity to the drive motor 13. The drive motor 13 drives the wheels with the electricity received from the battery 11. The drive motor 13 also charges the battery 11 with regenerated electricity. The auxiliary equipment 14 includes an electric motor for driving a compressor of an air conditioner, and a head light, for example. The battery 11 may be any kind of battery, and may be a lithium ion battery. The generator 10, the battery 11, the engine 12, the drive motor 13, and the auxiliary equipment 14 are herein collectively referred to simply as the generator 10 and the like as necessary for brevity.

The controller 20 is connected to the generator 10 and the like, and detects malfunctions in the generator 10 and the like to inform the driver of an action to be urged through the speaker 40 or the display 41. The way of connection between the controller 20 and the generator 10 and the like may be, but not necessarily, a controller area network (CAN). The controller 20 is a general-purpose microcomputer including a central processing unit (CPU), a memory, and an input-output unit. A computer program is installed on the microcomputer so as to function as the driving assistance device.

The microcomputer functions as a plurality of information processing circuits included in the driving assistance device when the computer program is executed. While the present embodiment is illustrated with the case in which the software is installed to fabricate the information processing circuits included in the driving assistance device, dedicated hardware for executing each information processing as described below can be prepared to compose the information processing circuits. The respective information processing circuits may be composed of individual hardware.

The controller 20 includes, as the respective information processing circuits, a malfunction detection unit 21, a traveling state detection unit 23, a traveling restriction detection unit 25, a candidate selection unit 27, a priority determination unit 29, and an information unit 31.

The malfunction detection unit 21 detects a plurality of malfunctions caused in the generator 10 and the like based on pieces of information acquired from the generator 10 and the like. The malfunction detection unit 21 outputs the information on the respective detected malfunctions to the traveling state detection unit 23, the traveling restriction detection unit 25, and the candidate selection unit 27. The malfunction detection unit 21 may be a sensor for detecting the malfunctions in the generator 10 and the like. Various kinds of malfunctions can be caused in the generator 10, the battery 11, the engine 12, the drive motor 13, and the auxiliary equipment 14. Examples of malfunctions caused in the generator 10 include a malfunction of a temperature sensor, a malfunction of a resolver, or a malfunction of a main circuit element.

The traveling state detection unit 23 detects a traveling state of the vehicle. In particular, the traveling state detection unit 23 detects the traveling state of the vehicle based on pieces of information acquired with a velocity sensor (not shown), for example. The traveling state includes a state in which the vehicle is traveling and a state in which the vehicle is stopping. The traveling state may include a state of a shift lever. For example, the traveling state includes a state in which the shift lever is set in the parking gear, and a state in which the shift lever is set in the drive gear. The traveling state detection unit 23 outputs the detected traveling state to the candidate selection unit 27.

The traveling restriction detection unit 25 detects a traveling restriction of the vehicle or calculates a restriction value of the traveling restriction in accordance with the plural malfunctions detected by the malfunction detection unit 21. For example, the traveling restriction of the vehicle is a restriction on a maximum speed and a maximum drive force (such as a maximum starting acceleration) of the vehicle, or refers to a state in which the vehicle cannot start up next. Examples of restriction parameters upon the execution of the restriction include a maximum drive power and a maximum drive torque. Specific explanations of the traveling restriction will be made below. The traveling restriction detection unit 25 outputs the detected traveling restriction to the candidate selection unit 27.

The candidate selection unit 27 (first selection circuit) selects a plurality of candidates for actions to be urged on the driver in accordance with the plural malfunctions detected by the malfunction detection unit 21.

The priority determination unit 29 (second selection circuit) chooses a candidate having a higher priority as an action to be urged on the driver from the plural candidates selected by the candidate selection unit 27, in accordance with the pieces of the information output from the malfunction detection unit 21, the traveling state detection unit 23, and the traveling restriction detection unit 25.

The information unit 31 (information circuit) informs the driver of the action chosen by the priority determination unit 29. The information unit 31 may inform the driver of the action with a voice through the speaker 40 or with an image displayed on the display 41. The display 41 may be, but not necessarily, a liquid crystal display installed in a meter panel or a liquid crystal display used for a car navigation device.

The action to be urged on the driver is described below with reference to FIG. 2. The action to be urged on the driver described in the first embodiment is an action presumed to be appropriate for the driver to take when malfunctions are caused in the devices (the generator 10 and the like) mounted on the vehicle.

When a malfunction A is presumed to be caused in the generator 10, for example, an action "Please have the vehicle serviced at the dealer" can be presented so as to be urged on the driver. The information unit 31 displays an image 60 shown in FIG. 2 on the display 41 to inform the driver of the action "Please have the vehicle serviced at the dealer" so as to be urged on the driver. The information unit 31 may inform the driver of the action "Please have the vehicle serviced at the dealer" with a voice through the speaker 40. The voice information may be presented either once or repeated a predetermined number of times.

When a malfunction B, which is different from the malfunction A, is presumed to be caused in the battery 11, an action "Please make a stop safely" can be presented so as to be urged on the driver. The information unit 31 displays an image 61 shown in FIG. 2 on the display 41 to inform the driver of the action "Please make a stop safely" so as to be urged on the driver. The information unit 31 may inform the driver of the action "Please make a stop safely" with a voice through the speaker 40.

As described above, the information unit 31 informs the driver of the action to be urged depending on the malfunction caused in the generator 10 or the like, so as to enable the driver to take an appropriate action.

A plurality of malfunctions may be simultaneously caused in the generator 10 and the like. For example, when the malfunction A is presumed to be caused in the generator 10, and the malfunction B is presumed to be caused in the battery 11, a plurality of actions to be urged on the driver, such as "Please have the vehicle serviced at the dealer" and "Please make a stop safely" as described above, can be presented to the driver. According to the first embodiment, when plural malfunctions are caused in the generator 10 and the like, the candidate selection unit 27 selects candidates for a plurality of actions to be urged on the driver based on the plural malfunctions caused. The candidates for the plural actions selected by the candidate selection unit 27 are herein the two actions of "Please have the vehicle serviced at the dealer" and "Please make a stop safely". The priority determination unit 29 chooses the candidate having a higher priority as the action to be urged on the driver from the plural actions selected by the candidate selection unit 27.

The order of the priority according to the first embodiment is determined according to at least one of the contents of the respective malfunctions, the traveling state, and the traveling restriction. The order of the priority may be determined by a combination of any of the contents of the plural malfunctions, the traveling state, and the traveling restriction.

The priority based only on the contents of the respective malfunctions is described below. For example, the priority determination unit 29 determines that the action based on the malfunction B has a higher priority than the action based on the malfunction A. In particular, when the action "Please have the vehicle serviced at the dealer" and the action "Please make a stop safely" are selected as the candidates for the actions to be urged on the driver, the priority determination unit 29 determines that the action "Please make a stop safely" has a higher priority than the action "Please have the vehicle serviced at the dealer". The priority determination unit 29 then chooses the action "Please make a stop safely" as the action to be urged on the driver.

The order of the priority can be preliminarily determined depending on the importance or urgency of the contents of the respective malfunctions. For example, a malfunction in a 12V-power supply system may be set to have a higher priority than malfunctions in the other devices.

The information unit 31 informs the driver of the action chosen by the priority determination unit 29. The driving assistance device according to the first embodiment thus can choose the candidate with the higher priority as the action to be urged on the driver only based on the contents of the respective malfunctions, when the plural malfunctions are caused in the devices (the generator 10 and the like) mounted on the vehicle, and when the candidates for the plural actions such as the images 60 and 61 as shown in FIG. 2 are selected. The driving assistance device then informs the driver of the chosen action so as to enable the driver to take an appropriate action.

Figure 2:
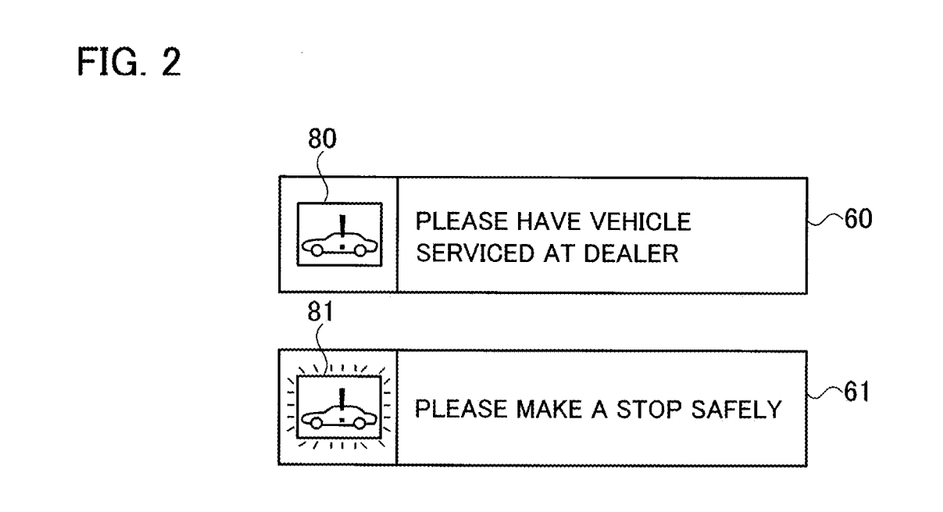
FIG. 2 is a diagram showing examples of actions urged on a driver.

The information unit 31 may indicate an image for calling the driver's attention, as illustrated with an image 80 shown in FIG. 2, when displaying the action urged on the driver on the display 41. The information unit 31 displays the image 60 indicating the action urged on the driver together with the image 80 for calling the driver's attention on the display 41, so as to allow the driver to immediately recognize the occurrence of a malfunction in the vehicle. The information unit 31 may display the image 80 in a lit-up state on the display 41 when the priority of the action is relatively low. This enables the driver to immediately recognize the occurrence of a malfunction in the vehicle. The information unit 31 may display an image for calling the driver's attention in a blinking state, as illustrated with the image 81 in FIG. 2, when the priority of the action is relatively high. This enables the driver to immediately recognize the action with the higher priority. The images 80 and 81 may be used upon the traveling restriction. As described above, since the traveling restriction is the restriction on the maximum speed and the maximum drive force of the vehicle, for example, the information unit 31 may switch the lighting state of the images 80 and 81 depending on the maximum speed and the maximum drive force. For example, when the maximum speed and the maximum drive force are each a predetermined value or greater, the information unit 31 may display the image 80 in the lit-up state on the display 41, as shown in FIG. 2. When the maximum speed and the maximum drive force are each smaller than the predetermined value, the information unit 31 may display the image 81 in the blinking state on the display 41, as shown in FIG. 2. The images 80 and 81 have the same functions in the following explanations from FIG. 3, and overlapping explanations may be omitted below.

Next, the traveling restriction of the vehicle is described below.

The traveling restriction detection unit 25 calculates the restriction value of the traveling restriction in accordance with the plural malfunctions detected by the malfunction detection unit 21. As used in the first embodiment, the information on the malfunction caused in each device detected by the malfunction detection unit 21 includes a restriction value of the corresponding device. The restriction value of the corresponding device is the maximum torque that the drive motor 13 can output, for example.

The traveling restriction detection unit 25 calculates the maximum speed and the maximum drive force of the vehicle as the restriction value of the traveling restriction in accordance with the restriction value of each device. The priority determination unit 29 chooses the candidate with the higher priority as the action to be urged on the driver in accordance with the maximum speed and the maximum drive force calculated by the traveling restriction detection unit 25.

As in the case described above, when the malfunction A is caused in the generator 10, and the malfunction B is caused in the battery 11, the candidate selection unit 27 selects the candidates for the plural actions to be urged on the driver based on the plural malfunctions caused. The candidates for the plural actions to be urged on the driver are herein the two actions of "Please have the vehicle serviced at the dealer" and "Please make a stop safely".

The traveling restriction detection unit 25 first calculates the maximum speed and the maximum drive force derived from the malfunction A. The traveling restriction detection unit 25 also calculates the maximum speed and the maximum drive force derived from the malfunction B. The calculation order may, be inverted. The priority determination unit 29 chooses, as the candidate with the higher priority, the action corresponding to the malfunction having a lower maximum speed and a lower maximum drive force than the other malfunction calculated by the traveling restriction determination unit 25. For example, when the maximum speed and the maximum drive force derived from the malfunction B are smaller than the maximum speed and the maximum drive force derived from the malfunction A, the priority determination unit 29 chooses the action "Please make a stop safely" as the action to be urged on the driver. The priority determination unit 29 thus can choose the candidate with the higher priority as the action to be urged on the driver only based on the traveling restriction.

Figure 3:
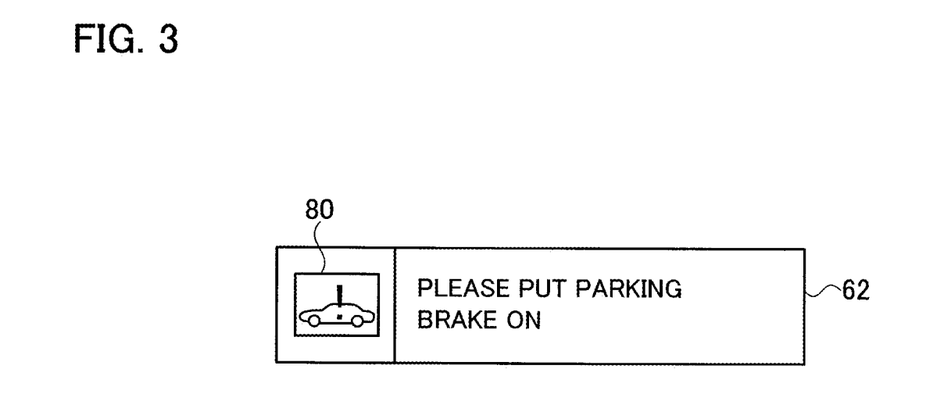
FIG. 3 is a diagram showing another example of the actions urged on the driver.

According to the first embodiment, the plural actions to be urged on the driver include at least an action regarding parking, an action regarding stopping, and an action regarding servicing. The action regarding stopping corresponds to the action "Please make a stop safely" described above. The action regarding servicing corresponds to the action "Please have the vehicle serviced at the dealer" described above. The action regarding parking is an action "Please put the parking brake on", as shown in FIG. 3. According to the first embodiment, the priority is lower for the action regarding servicing than for the action regarding parking and the action regarding stopping. The action regarding stopping is informed when the vehicle is traveling, while the action regarding parking is informed when the vehicle is stopping. The more specific explanations are as follows. As used in the first embodiment, the stop of the vehicle refers to a state in which the speed of the vehicle is zero, and the shift lever is set in the parking gear.

As in the case described above, when the malfunction A is caused in the generator 10, and the malfunction B is caused in the battery 11, the candidate selection unit 27 selects the candidates for the plural actions to be urged on the driver based on the plural malfunctions caused. The candidates for the plural actions to be urged on the driver are herein the three actions of "Please have the vehicle serviced at the dealer", "Please make a stop safely", and "Please put the parking brake on". The priority determination unit 29 chooses the candidate with the higher priority as the action to be urged on the driver from the candidates for the three actions selected by the candidate selection unit 27. First, the priority determination unit 29 determines that the priority is higher for the action "Please make a stop safely" and the action "Please put the parking brake on" than for the action "Please have the vehicle serviced at the dealer". The priority determination unit 29 chooses the action "Please make a stop safely" when the vehicle is traveling, and chooses the action "Please put the parking brake on" when the vehicle is stopping. The priority determination unit 29 thus can choose the candidate with the higher priority as the action to be urged on the driver only based on the traveling state. The information unit 31 may inform the driver of the action "Please put the parking brake on" with a voice, or may display an image 62 shown in FIG. 3 on the display 41. The information unit 31 may display the image 81 for calling the driver's attention in a lit-up state when the image 62 is displayed on the display 41.

Next, traveling restriction states are described below with reference to FIG. 4A and FIG. 4B. The traveling restriction detection unit 25 detects a plurality of traveling restriction states in accordance with the plural malfunctions detected by the malfunction detection unit 21. Examples of traveling restriction states detected by the traveling restriction detection unit 25 include a state "under traveling restrictions" and a state "unable to start up next", as indicated by images 63 and 64 shown in FIG. 4. As used in the first embodiment, the state "under traveling restrictions" refers to a state in which the vehicle's traveling is restricted, and the state "unable to start up next" refers to a state in which the vehicle cannot start up next. While the present embodiment uses the different terms for the traveling restriction and the traveling restriction states for illustration purposes, the term of the traveling restriction encompasses the traveling restriction states.

The priority determination unit 29 chooses a candidate having a higher priority as a traveling restriction state to be presented to the driver, from the candidates for the traveling restriction states selected by the traveling restriction determination unit 25.

As in the case described above, when the malfunction A is caused in the generator 10, and the malfunction B is caused in the battery 11, the traveling restriction state derived from the malfunction A caused in the generator 10 is presumed to correspond to the state "unable to start up next", and the traveling restriction state derived from the malfunction B caused in the battery 11 is presumed to correspond to the state "under traveling restrictions". The candidates for the plural traveling restriction states selected by the candidate selection unit 27 are the two states "under traveling restrictions" and "unable to start up next". The priority of the respective traveling restriction states is preliminarily determined. For example, when the state "under traveling restrictions" is set to have a higher priority than the state "unable to start up next", the priority determination unit 29 determines that the priority is higher for the traveling restriction state derived from the malfunction B than for the traveling restriction state derived from the malfunction A. The priority determination unit 29 chooses the state "under traveling restrictions" as the traveling restriction state to be presented to the driver. The information unit 31 then informs the driver of the traveling restriction state chosen by the priority determination unit 29. The information unit 31 may inform the driver of the state with the image 63 displayed on the display 41, or may inform the driver of the state while providing the voice stating "Traveling is being restricted".

Figure 4A:
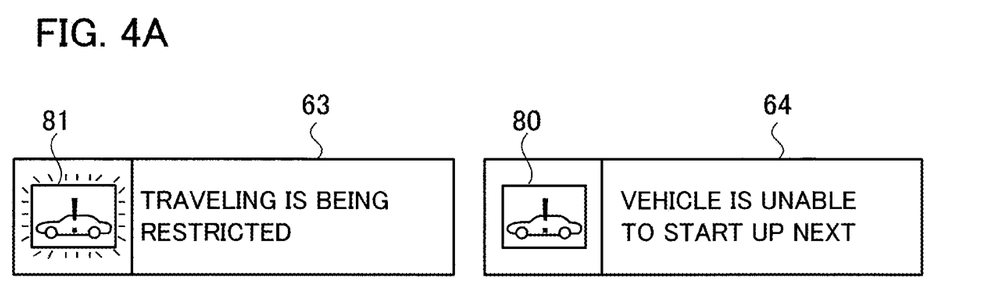
FIG. 4A is a diagram showing examples of traveling restriction states presented to the driver.
Figure 4B:
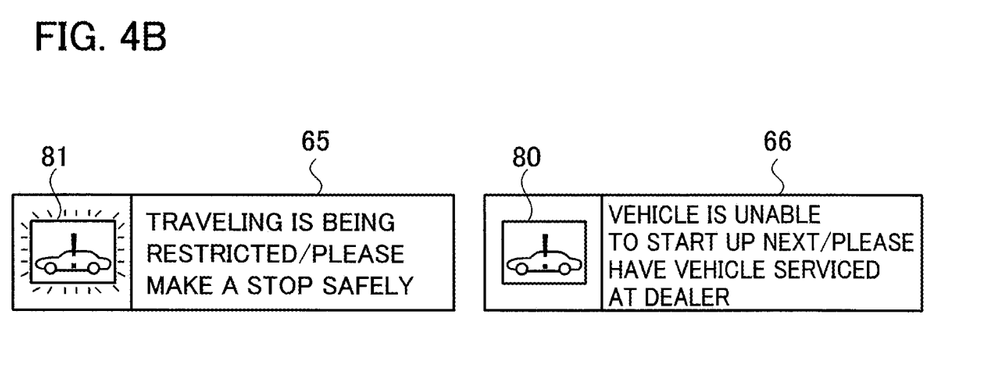
FIG. 4B is a diagram showing other examples of the traveling restriction states presented to the driver.

The information unit 31 may inform the driver of both the traveling restriction state and the action to be urged on the driver, as illustrated with images 65 and 66 shown in FIG. 4B. When the candidate selection unit 27 selects the plural traveling restriction states and the plural actions to be urged on the driver, the priority determination unit 29 can choose the traveling restriction state with the higher priority and the action with the higher priority. The following is a presumed case in which the plural traveling restriction states to be selected are the state "under traveling restrictions" and the state "unable to start up next", and the state "under traveling restrictions" has a higher priority than the state "unable to start up next". The following is also a presumed case in which the candidates for the actions to be selected are the action "Please have the vehicle serviced at the dealer" and the action "Please make a stop safely", and the action "Please make a stop safely" has a higher priority than the action "Please have the vehicle serviced at the dealer". While the image 65 and the image 66 shown in FIG. 4B are the options to choose, the information unit 31 displays, on the display 41, the image 65 having a higher priority than the image 66. The information unit 31 thus can inform the driver of both the traveling restriction state and the action urged on the driver. The information unit 31 may inform the driver while alternately presenting the phrase "Traveling is being restricted" and the phrase "Please make a stop safely" with a voice.

The information unit 31 may inform the driver only of the traveling restriction state, as shown in FIG. 4A, without the action to be urged on the driver.

The priority determination unit 29 can choose the candidate for the action to be urged on the driver having a higher priority only in accordance with the traveling restriction state. For example, as in the case described above, when the traveling restriction state derived from the malfunction A is the state "unable to start up next", the action "Please have the vehicle serviced at the dealer" is chosen to be urged on the driver. When the traveling restriction state derived from the malfunction B is the state "under traveling restrictions", the action "Please make a stop safely" is chosen to be urged on the driver. As described above, the action "Please make a stop safely" has a higher priority than the action "Please have the vehicle serviced at the dealer", so that the priority determination unit 29 can choose the action "Please make a stop safely" to be urged on the driver. The priority determination unit 29 thus can choose the action with the higher priority to be urged on the driver only based on the traveling restriction state.

Figure 5:
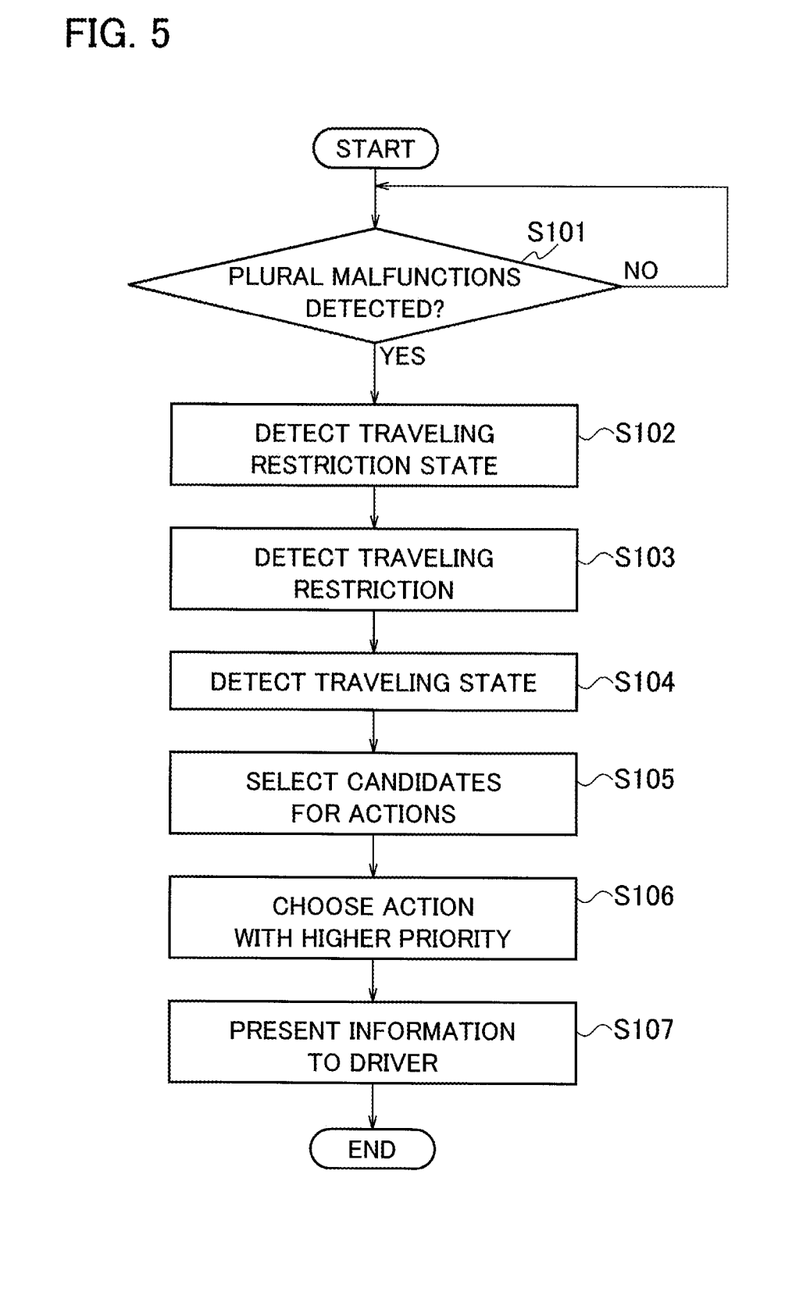
FIG. 5 is a flowchart showing an example of operation of the driving assistance device according to the first embodiment of the present invention.

Next, an example of operation of the driving assistance device according to the first embodiment is described below with reference to FIG. 5.

In step S101, the malfunction detection unit 21 detects a malfunction in the generator 10 or the like. When the malfunction detection unit 21 detects plural malfunctions, the process proceeds to step S102, and the traveling restriction detection unit 25 detects traveling restriction states of the vehicle based on the plural malfunctions detected by the malfunction detection unit 21. When the malfunction detection unit 21 does not detect more than one malfunction in step S101, the process is on standby.

The process proceeds to step S103, and the traveling restriction detection unit 25 detects a traveling restriction based on the plural malfunctions detected by the malfunction detection unit 21. The process proceeds to step S104, and the traveling state detection unit 23 detects a traveling state of the vehicle. The process proceeds to step S105, and the candidate selection unit 27 selects candidates for plural actions to be urged on the driver based on the plural malfunctions detected by the malfunction detection unit 21. The process proceeds to step S106, and the priority determination unit 29 chooses a candidate having a higher priority as the action to be urged on the driver from the candidates selected by the candidate selection unit 27. The priority determination unit 29 chooses the candidate with the higher priority as the action to be urged on the driver according to at least one of the contents of the respective malfunctions, the traveling state, the traveling restriction states, and the traveling restriction. The process proceeds to step S107, and the information unit 31 informs the driver of the action chosen by the priority determination unit 29.

Advantageous Effects

As described above, the driving assistance device according to the first embodiment can achieve the following advantageous effects.

The driving assistance device detects a plurality of malfunctions in the generator 10 and the like mounted on the vehicle, and selects candidates for a plurality of actions to be urged on the driver based on the detected plural malfunctions. The driving assistance device chooses a candidate having a higher priority as the action urged on the driver from the candidates for the plural actions, and informs the driver of the chosen action to be urged. The driving assistance device thus can inform the driver of the information with the higher priority when the plural malfunctions are caused in the vehicle. This enables the driver to take an appropriate action accordingly.

The driving assistance device also detects a traveling restriction of the vehicle in accordance with the detected plural malfunctions. The driving assistance device chooses a candidate having a higher priority as the action urged on the driver according to at least one of the contents of the respective malfunctions, the traveling state, and the traveling restriction. The driving assistance device thus can choose the candidate with the higher priority based on a small amount of information.

According to the first embodiment, the candidates for the plural actions to be urged on the driver include at least the action regarding parking, the action regarding stopping, and the action regarding servicing. The priority is set to be lower for the action regarding servicing than for the action regarding parking and the action regarding stopping. When the action regarding servicing and the action regarding stopping or parking are selected as the candidates for the plural actions to be urged on the driver, the driving assistance device can inform the driver of the action regarding stopping or parking prior to the action regarding servicing.

When the action regarding stopping and the action regarding parking are selected as the candidates for the plural actions to be urged on the driver, the driving assistance device chooses the action regarding stopping when the vehicle is traveling, and chooses the action regarding parking when the vehicle is stopping. The driving assistance device thus can present appropriate information to the driver in accordance with the plural malfunctions and the traveling state.

A plurality of traveling restriction states based on the plural malfunctions may be detected. The plural traveling restriction states are herein the state "under traveling restrictions" and the state "unable to start up next". The driving assistance device then informs the driver of the traveling restriction state having a higher priority. The driving assistance device informs the driver of the state "under traveling restrictions" when the priority is set to be higher for the state "under traveling restrictions" than for the state "unable to start up next". The driving assistance device thus can inform the driver of both the traveling restriction state with the higher priority and the action with the higher priority.

The driving assistance device may inform the driver of the traveling restriction state instead of the action urged on the driver. Informing the driver of both the traveling restriction state with the higher priority and the action with the higher priority may bother the driver, depending on the person. Only informing the driver of the traveling restriction state instead of the action urged on the driver can reduce the driver's discomfort.

The driving assistance device displays the image for presenting the information on the display 41 simultaneously with the image 80 or 81 for calling the driver's attention, as shown in FIG. 2. This enables the driver to immediately recognize the occurrence of a malfunction in the vehicle. The images 80 and 81 shown in FIG. 2 are used upon the traveling restriction, and the driving assistance device switches between the lit-up state and the blinking state of the images 80 and 81 depending on the traveling restriction (the maximum speed and the maximum drive force). For example, when the maximum speed and the maximum drive force are each a predetermined value or greater, the driving assistance device displays the image 80 in the lit-up state on the display 41 as shown in FIG. 2. When the maximum speed and the maximum drive force are each smaller than the predetermined value, the driving assistance device displays the image 81 in the blinking state on the display 41, as shown in FIG. 2. This enables the driver to immediately recognize a degradation in running performance.

The driving assistance device calculates the restriction value of the traveling restriction based on the plural malfunctions. In particular, the driving assistance device calculates the maximum speed and the maximum drive force of the vehicle as the restriction value of the traveling restriction based on the restriction values of the respective devices (the generator 10 and the like). The driving assistance device then chooses a candidate having a higher priority as the action to be urged on the driver in accordance with the maximum speed and the maximum drive force. The driving assistance device thus can choose the candidate for the action to be urged on the driver with the higher priority only based on the traveling restriction.

Second Embodiment

Figure 6:
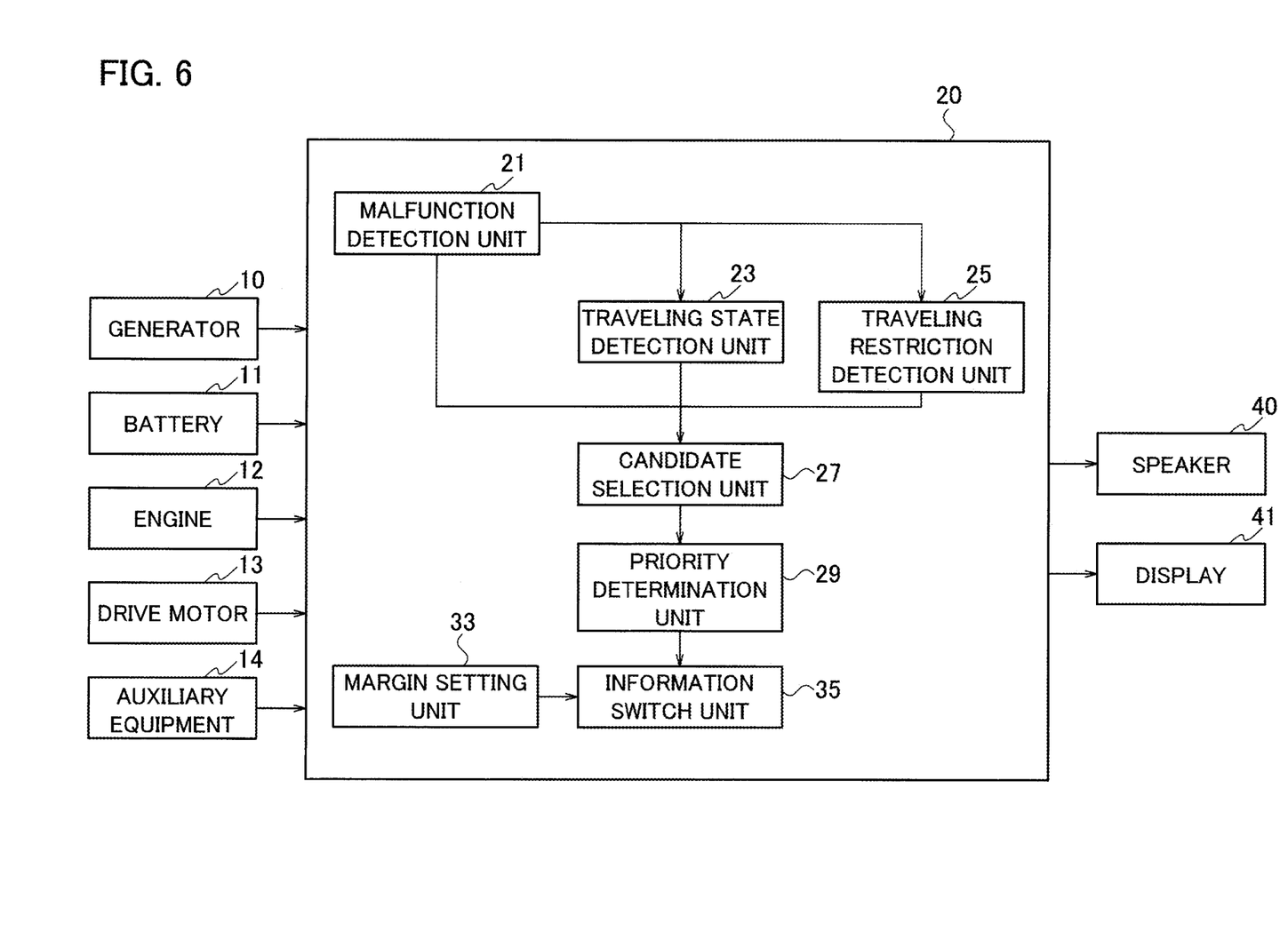
FIG. 6 is a schematic configuration diagram of a driving assistance device according to a second embodiment of the present invention.

A driving assistance device according to a second embodiment is described below with reference to FIG. 6. The second embodiment differs from the first embodiment in including an information switch unit 35 and a margin setting unit 33, instead of the information unit 31. The same elements as in the first embodiment are indicated by the same reference numerals, and overlapping explanations are not repeated below. The main differences are as follows.

The information switch unit 35 alternately informs the driver of a plurality of actions to be urged when the candidates for the plural actions have the same priority. The information switch unit 35 also alternately informs the driver of a plurality of traveling restriction states when the traveling restriction states have the same priority. When the priority determination unit 29 chooses the action regarding parking or the action regarding stopping after choosing the action regarding servicing, the information switch unit 35 immediately informs the driver of the action regarding parking or the action regarding stopping. When the priority determination unit 29 chooses the action regarding servicing after choosing the action regarding parking or the action regarding stopping, the information switch unit 35 informs the driver of the action regarding servicing by use of a margin set by the margin setting unit 33.

The margin setting unit 33 sets a margin for a threshold used when the information switch unit 35 switches the pieces of the information. When the priority determination unit 29 chooses the action regarding servicing after choosing the action regarding parking or the action regarding stopping, the margin setting unit 33 sets the margin for the threshold used when switching to the state of informing the driver of the action regarding servicing.

Figure 7:
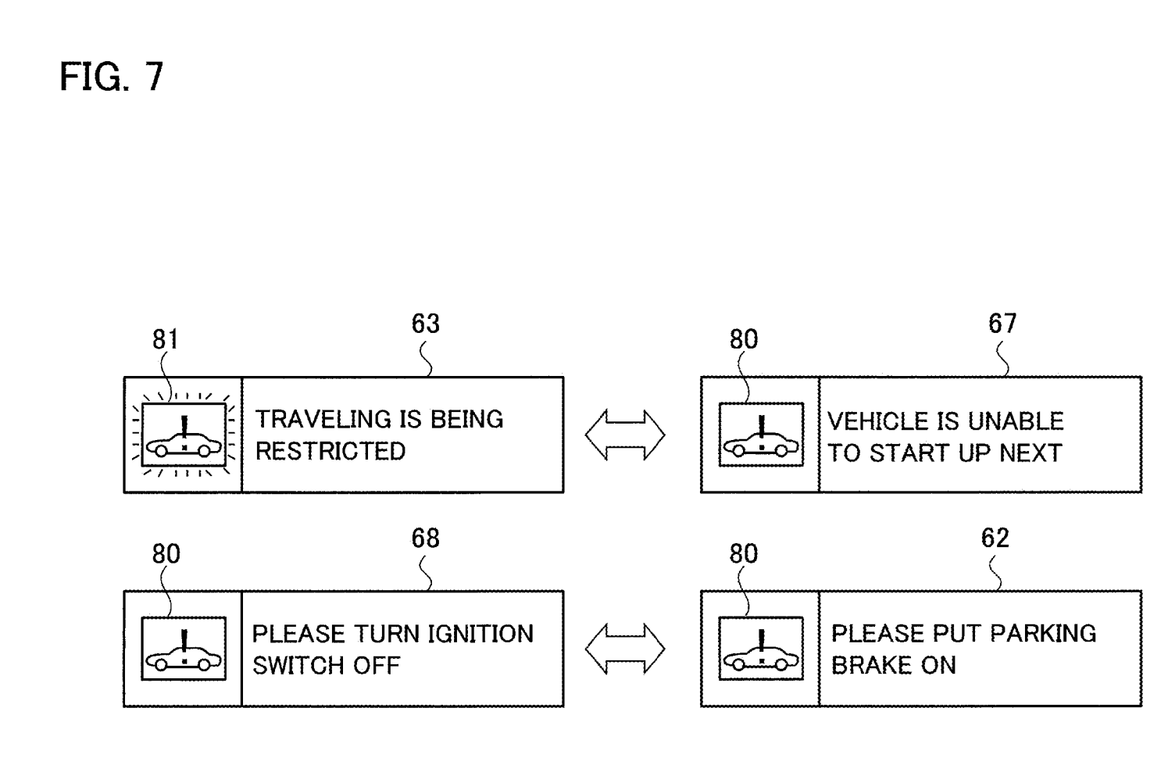
FIG. 7 is a diagram showing examples of actions urged on the driver and traveling restriction states presented to the driver.

The functions of the information switch unit 35 and the margin setting unit 33 are described in detail below with reference to FIG. 7 to FIG. 9.

The following is a presumed case in which the plural malfunctions are caused in the generator 10 and the like, and the plural traveling restriction states detected by the traveling restriction detection unit 25 correspond to the state "under traveling restrictions" and the state "unable to start up next". When the state "under traveling restrictions" and the state "unable to start up next" have the same priority, the information switch unit 35 alternately displays an image 63 and an image 67 shown in FIG. 7 on the display 41 to inform the driver of the respective traveling restriction states. The information switch unit 35 may inform the driver while alternately presenting the phrase "Traveling is being restricted" and the state "unable to start up next" with a voice.

The following is a presumed case in which the plural malfunctions are caused in the generator 10 and the like, and the candidates for the plural actions to be urged on the driver selected by the candidate selection unit 27 are the action "Please turn the ignition switch off" and the action "Please put the parking brake on". When the action "Please turn the ignition switch off" and the action "Please put the parking brake on" have the same priority, the information switch unit 35 alternately displays an image 68 and the image 62 shown in FIG. 7 on the display 41 to inform the driver of the respective actions. The information switch unit 35 may inform the driver while alternately presenting the phrase "Please turn the ignition switch off" and the phrase "Please put the parking brake on" with a voice.

When the plural malfunctions are detected in the generator 10 and the like, and the plural actions to be urged on the driver or the plural traveling restriction states to be informed are thus selected, the driving assistance device informs the driver of the action or the traveling restriction state with the higher priority. After the driving assistance device presents the respective information to the driver, still another malfunction can sometimes be detected.

Figure 8:
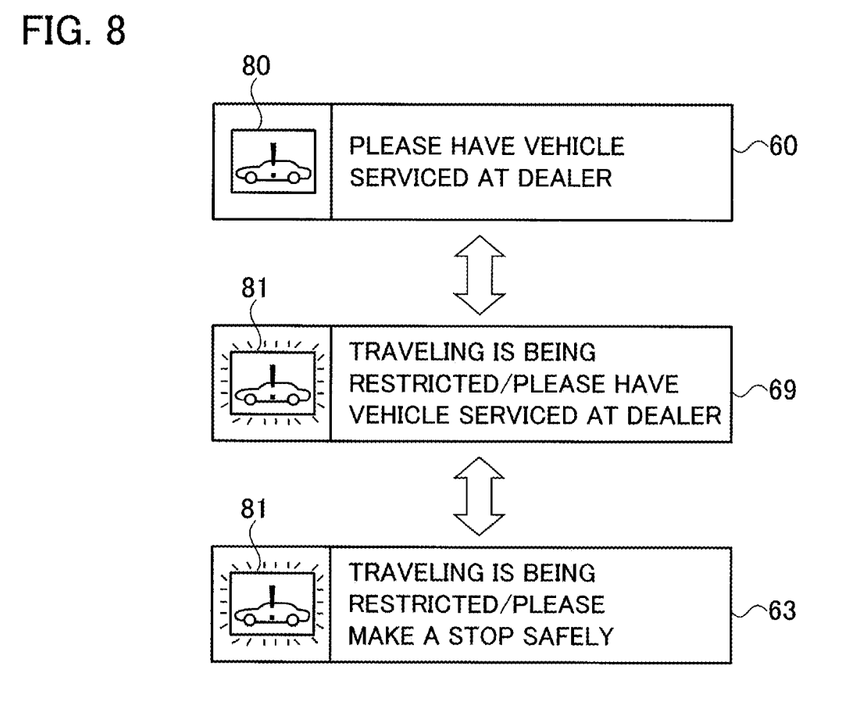
FIG. 8 is a diagram showing other examples of the actions urged on the driver.
Figure 9:
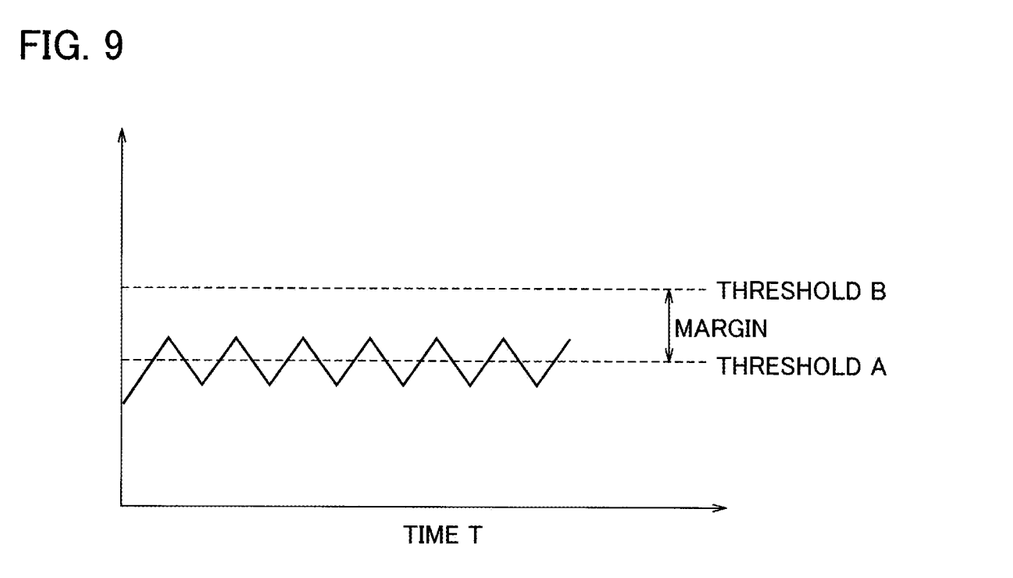
FIG. 9 is a diagram illustrating a margin to be set according to the second embodiment of the present invention.

For example, when the priority determination unit 29 chooses the action regarding servicing and the state "under traveling restrictions", an image 69 shown in FIG. 8 is displayed on the display 41. The information can be provided with a voice instead of the image 69. The following is a presumed case in which still another malfunction is detected after the image 69 is displayed on the display 41, and the candidate selection unit 27 selects the action "Please have the vehicle serviced at the dealer" and the action "Please make a stop safely". As described above, the priority determination unit 29 chooses the action "Please make a stop safely" as the action urged on the driver. The information switch unit 35 switches from the image 69 to the image 63, as shown in FIG. 8, in accordance with the choice result by the priority determination unit 29. The information switch unit 35 immediately switches from the image 69 to the image 63 so as to immediately allow the driver to recognize the action with the higher priority. The information switch unit 35 also immediately switches the pieces of the voice information. While the above case is illustrated with the action regarding stopping while stating "Please make a stop safely", the action to be urged may be the action regarding parking.

One or more of the plural malfunctions detected in the generator 10 and the like are sometimes cleared out. The information switch unit 35 then may switch from the image 63 to the image 69. The specific explanations are as follows. When the priority determination unit 29 chooses the action regarding stopping and the state "under traveling restrictions", the image 63 shown in FIG. 8 is displayed on the display 41. The information, of course, can be presented with a voice, instead of the image 63. When one or more of the plural malfunctions are presumed to be cleared out after the image 63 is displayed on the display 41, and the candidate selection unit 27 then selects only the action "Please have the vehicle serviced at the dealer", the priority determination unit 29 chooses the action "Please have the vehicle serviced at the dealer" to be urged on the driver. The information switch unit 35 then switches from the image 63 to the image 69 shown in FIG. 8 in accordance with the choice result by the priority determination unit 29. The information switch unit 35 makes a switch from the image 63 to the image 69 after a predetermined lapse of time. The reason for this is that a frequent switch between the images may cause the driver to feel uncomfortable. The information switch unit 35 also makes a switch between the pieces of the voice information after a predetermined lapse of time.

When the state "under traveling restrictions" shown in FIG. 8 is cleared up, the information switch unit 35 can switch from the image 69 to the image 60. The information switch unit 35 may switch from the image 69 to the image 60 after a predetermined lapse of time. The pieces of the voice information are switched in the same manner.

A threshold for switching the images may be set when the information switch unit 35 switches from the image 63 to the image 69. The threshold is determined depending on a value obtained such that the plural malfunctions are normalized, for example. As shown in FIG. 9, when the value obtained by the normalization of the plural malfunctions exceeds a threshold A, for example, the information switch unit 35 can switch from the image 63 to the image 69. This threshold A, however, may lead to a frequent switch between the images, as shown in FIG. 9. The frequent switch between the images may cause the driver to feel uncomfortable. The margin setting unit 33 then sets a margin for the threshold A so as to use a new threshold B shown in FIG. 9. Setting the margin can avoid switching between the images unless the value obtained by the normalization of the plural malfunctions exceeds the threshold B, as shown in FIG. 9, so as to reduce the driver's discomfort. The margin setting unit 33 may set a margin for a threshold used when switching from the image 69 to the image 60 shown in FIG. 8. When the margin is set for the threshold used when switching from the image 69 to the image 60 shown in FIG. 8, the information switch unit 35 may make a switch from the image 69 to the image 60 after a predetermined lapse of time after the value obtained by the normalization of the plural malfunctions exceeds the threshold obtained after setting the margin.

As described above, the driving assistance device according to the second embodiment can achieve the following advantageous effects.

The driving assistance device alternately informs the driver of a plurality of actions to be urged on the driver when the candidates for the plural actions have the same priority. The driving assistance device also alternately informs the driver of a plurality of traveling restriction states when the traveling restriction states have the same priority. The driving assistance device thus can present appropriate information to the driver.

The driving assistance device, when choosing the action regarding parking or the action regarding stopping after choosing the action regarding servicing, immediately informs the driver of the action regarding parking or the action regarding stopping. The driving assistance device thus can immediately inform the driver of the action having a higher priority. The driving assistance device, when choosing the action regarding servicing after choosing the action regarding parking or the action regarding stopping, informs the driver of the action regarding servicing after a predetermined lapse of time. This decreases the frequency of switching between the images, so as to reduce the driver's discomfort.

The driving assistance device sets a margin for a threshold used when the state in which the vehicle is under traveling restrictions and the state of presenting the action regarding parking or the action regarding stopping are switched to the state in which the vehicle is under traveling restrictions and the state of presenting the action regarding servicing. This decreases the frequency of switching between the images, so as to reduce the driver's discomfort.

The respective functions described in the above embodiments can be implemented in single or plural processing circuits. The respective processing circuits include a programmed processing device, such as a processing device including an electric circuit. The respective processing circuits include an application-specific integrated circuit (ASIC) configured to execute the functions described above or a device including circuit components.

While the present invention has been described above by reference to the embodiments, it should be understood that the present invention is not intended to be limited to the descriptions and the drawings composing part of this disclosure. Various alternative embodiments, examples, and technical applications will be apparent to those skilled in the art according to this disclosure.

While the first embodiment and the second embodiment have been illustrated with the case in which the plural malfunctions are detected in the plural devices, the present invention may be applied to a case in which the plural malfunctions are detected in a single device. The traveling restriction may include a state of charge (SOC) of the battery 11.

REFERENCE SIGNS LIST

10 GENERATOR
11 BATTERY
12 ENGINE
13 DRIVE MOTOR
14 AUXILIARY EQUIPMENT
20 CONTROLLER
21 MALFUNCTION DETECTION UNIT
23 TRAVELING STATE DETECTION UNIT
25 TRAVELING RESTRICTION DETECTION UNIT
27 CANDIDATE SELECTION UNIT
29 PRIORITY DETERMINATION UNIT
31 INFORMATION UNIT
33 MARGIN SETTING UNIT
35 INFORMATION SWITCH UNIT
40 SPEAKER
41 DISPLAY
60 to 69, 80, 81 IMAGE

The invention claimed is:

1. A driving assistance method comprising:
a step of detecting a plurality of malfunctions in devices mounted on a vehicle;
a step of detecting a traveling restriction of the vehicle;
a step of selecting candidates for a plurality of actions urged to the driver in accordance with the plurality of malfunctions;
a step of choosing a candidate having a higher priority as an action to be urged to the driver from the candidates for the plurality of actions; and
a step of informing a driver of the traveling restriction and the action to be urged to the driver,
wherein, when a plurality of traveling restrictions are detected in association with the plurality of malfunctions, the informing step informs the driver of a traveling restriction having a higher priority chosen from the plurality of traveling restrictions,
the plurality of traveling restrictions include a state in which traveling of the vehicle is restricted and a state in which the vehicle cannot start up next,
in the state in which traveling of the vehicle is restricted, the driver is informed that the vehicle is under traveling restrictions,
in the state in which the vehicle cannot start up next, the driver is informed for urging the driver to have the vehicle serviced at a dealer,
the state in which the traveling of the vehicle is restricted is defined as a state in which a maximum speed and a maximum drive force of the vehicle are restricted,
the maximum speed and the maximum drive force derived from a first malfunction of the plurality of malfunctions are calculated, and the maximum speed and maximum drive force derived from a second malfunction of the plurality of malfunctions are calculated, and
the action corresponding to the first malfunction having a lower maximum speed and a lower maximum drive force than the second malfunction is chosen as the candidate having the higher priority.

2. The driving assistance method according to claim 1, wherein:
the candidates for the plurality of actions urged to the driver include at least an action regarding parking, an action regarding stopping, and an action regarding servicing; and
the action regarding servicing has a lower priority than the action regarding parking and the action regarding stopping.

3. The driving assistance method according to claim 1, wherein the plurality of actions are alternately informed when the candidates for the plurality of actions have an equivalent priority, and the plurality of traveling restrictions are alternately informed when the plurality of traveling restrictions have an equivalent priority.

4. The driving assistance method according to claim 2, wherein:
the action regarding parking or the action regarding stopping is immediately informed when the action regarding parking or the action regarding stopping is chosen after the action regarding servicing is chosen;
a first threshold is determined depending on a value obtained such that the plurality of malfunctions are normalized;

a second threshold is determined by setting a margin for the first threshold to be greater than the first threshold; and the second threshold is used when switching to a state of presenting the action regarding servicing when the action regarding servicing is chosen after the action regarding parking or the action regarding stopping is chosen.

5. The driving assistance method according to claim 4, wherein the margin is set when switching from the state in which the traveling of the vehicle is restricted and a state of presenting the action regarding parking or the action regarding stopping, to the state in which the traveling of the vehicle is restricted and the state of presenting the action regarding servicing.

6. The driving assistance method according to claim 4, wherein the margin is set when switching from the state in which the traveling of the vehicle is restricted and the state of presenting the action regarding servicing, to a state in which the traveling of the vehicle is not restricted and the state of presenting the action regarding servicing.

7. The driving assistance method according to claim 1, further comprising a step of displaying an image on a display mounted on the vehicle,
wherein the image is an image regarding the traveling restriction, and
wherein the step of displaying the image switches between a blinking state and a lit-up state of the image depending on the traveling restriction.

8. A driving assistance device comprising:
a sensor configured to detect a plurality of malfunctions in devices mounted on a vehicle;
a traveling restriction detection circuit configured to detect a traveling restriction of the vehicle;
a candidate selection circuit configured to select candidates for a plurality of actions urged to the driver in accordance with the plurality of malfunctions;
a priority determination circuit configured to choose a candidate having a higher priority as an action to be urged to the driver from the candidates for the plurality of actions; and
an information circuit configured to inform the driver of the traveling restriction detected by the traveling restriction detection circuit and the action to be urged to the driver,
wherein, when the traveling restriction detection circuit detects a plurality of traveling restrictions based on the plurality of malfunctions detected by the sensor, the information circuit informs the driver of a traveling restriction having a higher priority chosen from the plurality of traveling restrictions,
the plurality of traveling restrictions include a state in which traveling of the vehicle is restricted and a state in which the vehicle cannot start up next,
in the state in which traveling of the vehicle is restricted, the driver is informed that the vehicle is under traveling restrictions,
in the state in which the vehicle cannot start up next, the driver is informed for urging the driver to have the vehicle serviced at a dealer,
the state in which the traveling of the vehicle is restricted is defined as a maximum speed and a maximum drive force of the vehicle are restricted,
the traveling restriction detection circuit calculates the maximum speed and the maximum drive force derived from a first malfunction of the plurality of malfunctions, and calculates the maximum speed and maximum drive force derived from a second malfunction of the plurality of malfunctions, and
the priority determination circuit chooses, as the candidate having the higher priority, the action corresponding to the first malfunction having a lower maximum speed and a lower maximum drive force than the second malfunction.

9. A driving assistance method comprising:
a step of detecting a plurality of malfunctions in devices mounted on a vehicle;
a step of detecting a traveling restriction of the vehicle;
a step of selecting candidates for a plurality of actions urged to the driver in accordance with the plurality of malfunctions;
a step of choosing a candidate having a higher priority as an action to be urged to the driver from the candidates for the plurality of actions; and
a step of informing a driver of the traveling restriction and the action to be urged to the driver,
wherein, when a plurality of traveling restrictions are detected in association with the plurality of malfunctions, the informing step includes informing the driver of a traveling restriction having a higher priority chosen from the plurality of traveling restrictions,
the plurality of traveling restrictions include a state in which traveling of the vehicle is restricted and a state in which the vehicle cannot start up next,
in the state in which traveling of the vehicle is restricted, the driver is informed that the vehicle is under traveling restrictions,
in the state in which the vehicle cannot start up next, the driver is urged the driver to have the vehicle serviced at a dealer,
the state in which the traveling of the vehicle is restricted is defined as a state in which a maximum speed and a maximum drive force of the vehicle are restricted,
the maximum speed and the maximum drive force derived from a first malfunction of the plurality of malfunctions are calculated, and the maximum speed and maximum drive force derived from a second malfunction of the plurality of malfunctions are calculated, the first malfunction being different from the second malfunction, and
upon the calculated maximum speed and the calculated maximum drive force derived from the first malfunction being lower than the calculated maximum speed and the calculated maximum drive force derived from the second malfunction, the action corresponding to the first malfunction is chosen as the candidate having the higher priority.

* * * * *